(12) United States Patent
Ryu et al.

(10) Patent No.: US 12,347,147 B2
(45) Date of Patent: Jul. 1, 2025

(54) METHOD AND APPARATUS FOR IMMERSIVE VIDEO ENCODING AND DECODING

(71) Applicant: Research & Business Foundation Sungkyunkwan University, Suwon-si (KR)

(72) Inventors: Eun Seok Ryu, Seoul (KR); Jong Beom Jeong, Yangju-si (KR); Soon Bin Lee, Seongnam-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 541 days.

(21) Appl. No.: 17/728,344

(22) Filed: Apr. 25, 2022

(65) Prior Publication Data

US 2022/0343545 A1 Oct. 27, 2022

(30) Foreign Application Priority Data

Apr. 23, 2021 (KR) .......................... 10-2021-0053225
Feb. 4, 2022 (KR) .......................... 10-2022-0014916

(51) Int. Cl.
*G06T 9/00* (2006.01)
*G06T 3/40* (2006.01)
*H04N 19/105* (2014.01)
*H04N 19/119* (2014.01)
*H04N 19/176* (2014.01)
*H04N 19/30* (2014.01)

(52) U.S. Cl.
CPC .................. *G06T 9/00* (2013.01); *G06T 3/40* (2013.01); *H04N 19/105* (2014.11); *H04N 19/119* (2014.11); *H04N 19/176* (2014.11); *H04N 19/30* (2014.11)

(58) Field of Classification Search
CPC ........... G06T 9/00; G06T 3/40; H04N 19/105; H04N 19/119; H04N 19/176; H04N 19/30
USPC ........................................................ 382/128
See application file for complete search history.

(56) References Cited

U.S. PATENT DOCUMENTS

| | | | |
|---|---|---|---|
| 2019/0378333 A1* | 12/2019 | Castaneda | G06T 7/251 |
| 2020/0359000 A1* | 11/2020 | Shin | H04N 13/156 |
| 2021/0258590 A1* | 8/2021 | Boyce | H04N 19/39 |
| 2021/0329209 A1* | 10/2021 | Lee | H04N 19/70 |
| 2022/0159298 A1* | 5/2022 | Boyce | H04N 19/124 |
| 2023/0007277 A1* | 1/2023 | Salahieh | H04N 19/132 |
| 2023/0345020 A1* | 10/2023 | Yu | G06T 7/50 |

* cited by examiner

*Primary Examiner* — Michael R Neff
(74) *Attorney, Agent, or Firm* — NSIP Law

(57) ABSTRACT

An image encoding/decoding method and apparatus are provided. An image decoding method according to the present disclosure includes: receiving an image, in which a first atlas for a basic view of a current image and a second atlas for an additional view of the current image are merged; extracting an image divided in a predetermined image unit within the first atlas and the second atlas; dividing the first atlas and the second atlas in the predetermined image unit; and reconstructing the image divided in the predetermined image unit, wherein the dividing of the first atlas and the second atlas in the predetermined image unit may non-uniformly divide the first atlas and the second atlas.

10 Claims, 14 Drawing Sheets

FIG. 11

| Class | VTM anchor | VTM anchor (JACLA off) | m54274 | m56827 +MCTS | DATRA | DATRA +AVLQ |
|---|---|---|---|---|---|---|
| CG-A | 100.00% | 99.26% | 90.43% | 78.11% | 97.12% | 81.48% |
| CG-B | 100.00% | 101.00% | 104.41% | 85.81% | 78.87% | 70.09% |
| CG-O | 100.00% | 90.72% | 55.07% | 42.52% | 45.82% | 35.43% |
| CG-J | 100.00% | 93.64% | 65.46% | 50.37% | 52.01% | 42.38% |
| NC-D | 100.00% | 100.90% | 105.45% | 88.16% | 76.74% | 69.54% |
| NC-E | 100.00% | 94.07% | 51.01% | 38.69% | 39.27% | 32.16% |
| NC-P | 100.00% | 87.12% | 59.08% | 43.75% | 43.28% | 35.99% |
| CG-N | 100.00% | 100.56% | 107.23% | 95.81% | 82.89% | 68.03% |
| CG-R | 100.00% | 87.88% | 60.70% | 46.10% | 46.91% | 39.29% |
| CG-Q | 100.00% | 100.51% | 105.97% | 88.00% | 71.31% | 66.04% |
| CG-C | 100.00% | 98.80% | 93.94% | 83.07% | 97.78% | 84.24% |
| Average | 100.00% | 95.86% | 81.71% | 67.31% | 66.55% | 56.79% |

FIG. 12

| Class | VTM anchor | VTM anchor (JACLA off) | m54274 | m56827 +MCTS | DATRA | DATRA +AVLQ |
|---|---|---|---|---|---|---|
| CG-A | 0.00% | -0.65% | -1.74% | -1.70% | -1.76% | -16.77% |
| CG-B | 0.00% | -0.60% | -1.07% | -1.29% | -0.65% | -15.71% |
| CG-O | 0.00% | -1.67% | 0.94% | 1.33% | 1.33% | 0.70% |
| CG-J | 0.00% | 0.71% | 0.32% | 0.77% | 0.41% | 1.87% |
| NC-D | 0.00% | -3.13% | -2.76% | -2.91% | -2.95% | -25.49% |
| NC-E | 0.00% | -4.65% | -1.23% | -0.81% | -1.05% | -0.61% |
| NC-P | 0.00% | -3.50% | -2.02% | -1.99% | -1.98% | -1.91% |
| CG-N | 0.00% | 0.57% | 0.33% | 0.06% | 1.31% | -22.46% |
| CG-R | 0.00% | 5.11% | 5.78% | 5.49% | 5.63% | 5.99% |
| CG-Q | 0.00% | 1.26% | 1.32% | 0.19% | 1.76% | -19.96% |
| CG-C | 0.00% | -0.74% | 1.01% | 1.02% | 1.21% | -27.81% |
| Average | 0.00% | -0.66% | 0.08% | 0.01% | 0.30% | -11.11% |

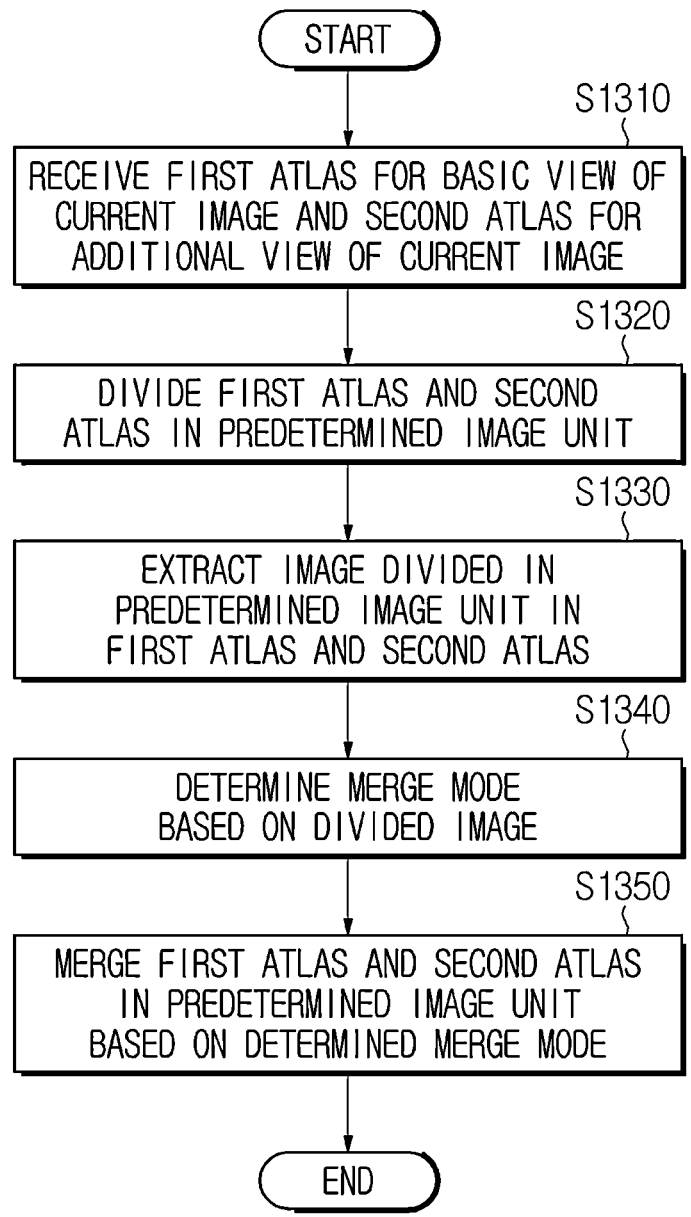

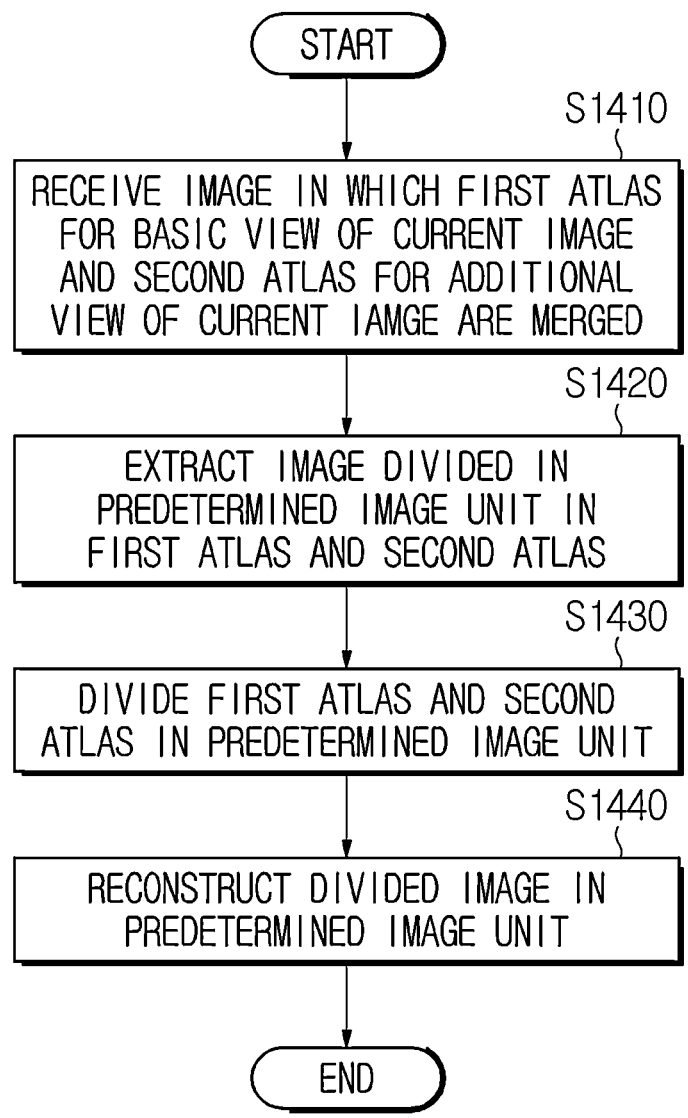

METHOD AND APPARATUS FOR IMMERSIVE VIDEO ENCODING AND DECODING

CROSS REFERENCE TO RELATED APPLICATION

The present application claims priority to a KR provisional application 10-2021-0053225, filed Apr. 23, 2021 and a KR patent application 10-2022-0014916, filed Feb. 4, 2022, the entire contents of which are incorporated herein for all purposes by this reference.

BACKGROUND

Field

The present invention relates to an immersive video encoding/decoding method and apparatus and, more particularly, to an image encoding/decoding method and apparatus that pack a frame by dividing and merging atlas based on at least one of a tile unit and a subpicture unit.

Description of Related Art

Virtual reality services generate full 360-degree videos (or omnidirectional videos, 360-degree videos or immersive videos) in realistic or computer graphics (CG) formats, play such videos on a personal VR unit like a head mounted display (HMD) and a smartphone and evolve to maximize senses of immersion and realism.

Current researches have shown that 6 degrees of freedom (DoF) need to be reproduced in order to play a natural and highly immersive full 360-degree video through an HMD. That is, an image should be played through an HMD so that it can be viewed by a viewer moving in six directions including (1) left-and-right translation, (2) up-and-down rotation, (3) up-and-down translation, and (4) left-and-right rotation. As of now, an omnidirectional video, which plays a realistic image obtained by a camera, has 3 DoF and reproduces images by detecting mainly movements of (2) vertical rotation and (4) horizontal rotation, so that no image thus provided can be gazed by a viewer in a horizontal movement and a vertical movement.

Therefore, for a viewer who has not only a usual rotational movement but also vertical and horizontal movements, in order to reproduce corresponding images and provide a perfect and natural stereoscopic image, it is necessary to pack a frame by dividing and merging an atlas, which is generated in an encoder, based on at least one of a tile unit and a subpicture unit.

SUMMARY

The present disclosure is directed to provide a method and apparatus for dividing an atlas based on at least one of a tile unit and a subpicture unit.

In addition, the present disclosure is directed to provide a method and apparatus for extracting at least one of a tile and a subpicture in an atlas.

In addition, the present disclosure is directed to provide a method and apparatus for merging an atlas based on at least one of a tile unit and a subpicture unit.

In addition, the present disclosure is directed to provide a method and apparatus for efficiently allocating quality based on at least one of a tile unit and a subpicture unit within a merged frame.

In addition, the present disclosure is directed to provide a method and apparatus for reducing a number of instances of a decoder.

In addition, the present disclosure is directed to provide a method and apparatus for generating a merged frame without empty space.

In addition, the present disclosure is directed to provide a method and apparatus for reproducing a natural full 360-degree video.

In addition, the present disclosure is directed to provide a method and apparatus for improving image encoding/decoding efficiency.

In addition, the present disclosure is directed to provide a recording medium for storing a bitstream generated by an image encoding/decoding method or apparatus of the present disclosure.

In addition, the present disclosure is directed to provide a method and apparatus for transmitting a bitstream generated by an image encoding/decoding method or apparatus of the present disclosure.

An image encoding method according to the present disclosure may include: receiving a first atlas for a basic view of a current image and a second atlas for an additional view of the current image; dividing the first atlas and the second atlas in a predetermined image unit; extracting an image divided in the predetermined image within the first atlas and the second atlas; determining a merge mode based on the divided image; and merging the first atlas and the second atlas in the predetermined image unit based on the determined merge mode, wherein the dividing of the first atlas and the second atlas in the predetermined image unit may non-uniformly divide the first atlas and the second atlas.

In an image encoding method according to the present disclosure, the dividing of the first atlas and the second atlas in the predetermined image unit may uniformly divide the first atlas and the second atlas.

In an image encoding method according to the present disclosure, the predetermined image unit may correspond to at least one of a tile unit and a subpicture unit.

In an image encoding method according to the present disclosure, the first atlas may include at least one or more of a texture atlas and a geometry atlas.

In an image encoding method according to the present disclosure, the second atlas may include at least one or more of a texture atlas and a geometry atlas.

In an image encoding method according to the present disclosure, allocating high quality to the first atlas in the predetermined image unit may be included.

In an image encoding method according to the present disclosure, allocating low quality to the second atlas in the predetermined image unit may be included.

In an image encoding method according to the present disclosure, the merging of the first atlas and the second atlas in the predetermined image unit merges the first atlas and the second atlas so that no empty space exists in a merged image.

An image decoding method according to the present disclosure may include: receiving an image, in which a first atlas for a basic view of a current image and a second atlas for an additional view of the current image are merged; extracting an image divided in a predetermined image unit within the first atlas and the second atlas; dividing the first atlas and the second atlas in the predetermined image unit; and reconstructing the image divided in the predetermined image unit, wherein the dividing of the first atlas and the second atlas in the predetermined image unit may non-uniformly divide the first atlas and the second atlas.

In an image decoding method according to the present disclosure, the dividing of the first atlas and the second atlas in the predetermined image unit may uniformly divide the first atlas and the second atlas.

In an image decoding method according to the present disclosure, the predetermined image unit may correspond to at least one of a tile unit and a subpicture unit.

In an image decoding method according to the present disclosure, the first atlas may include at least one or more of a texture atlas and a geometry atlas.

In an image decoding method according to the present disclosure, the second atlas may include at least one or more of a texture atlas and a geometry atlas.

In an image decoding method according to the present disclosure, allocating high quality to the first atlas in the predetermined image unit may be included.

In an image decoding method according to the present disclosure, allocating low quality to the second atlas in the predetermined image unit may be included.

In addition, according to the present disclosure, it is possible to provide a method for transmitting a bitstream generated by an image encoding method or apparatus according to the present disclosure.

In addition, according to the present disclosure, it is possible to provide a recording medium storing a bitstream generated by an image encoding method or apparatus according to the present disclosure.

In addition, according to the present disclosure, it is possible to provide a recording medium storing a bitstream received, decoded and used to reconstruct an image by an image decoding apparatus according to the present disclosure.

According to the present disclosure, it is possible to provide a method and apparatus for dividing an atlas based on at least one of a tile unit and a subpicture unit.

In addition, according to the present disclosure, it is possible to provide a method and apparatus for extracting at least one of a tile and a subpicture in an atlas.

In addition, according to the present disclosure, it is possible to provide a method and apparatus for merging an atlas based on at least one of a tile unit and a subpicture unit.

In addition, according to the present disclosure, it is possible to provide a method and apparatus for efficiently allocating quality based on at least one of a tile unit and a subpicture unit within a merged frame.

In addition, according to the present disclosure, it is possible to provide a method and apparatus for reducing a number of instances of a decoder.

In addition, according to the present disclosure, it is possible to provide a method and apparatus for generating a merged frame without empty space.

In addition, according to the present disclosure, it is possible to provide a method and apparatus for reproducing a natural full 360-degree video.

In addition, according to the present disclosure, it is possible to provide a method and apparatus for improving image encoding/decoding efficiency.

Effects obtained in the present disclosure are not limited to the above-mentioned effects, and other effects not mentioned above may be clearly understood by those skilled in the art from the following description.

BRIEF DESCRIPTION OF THE DRAWINGS

FIG. 11 is a view showing reduction of decoding time by dividing and merging an atlas non-uniformly in a tile or subpicture unit according to an embodiment of the present disclosure.

FIG. 12 is a view showing reduction of bandwidth by dividing and merging an atlas non-uniformly in a tile or subpicture unit according to an embodiment of the present disclosure.

FIG. 13 is a view showing an example of an encoding process of an immersive video according to an embodiment of the present disclosure.

FIG. 14 is a view showing an example of a decoding process of an immersive video according to an embodiment of the present disclosure.

DETAILED DESCRIPTION

Figure 1:
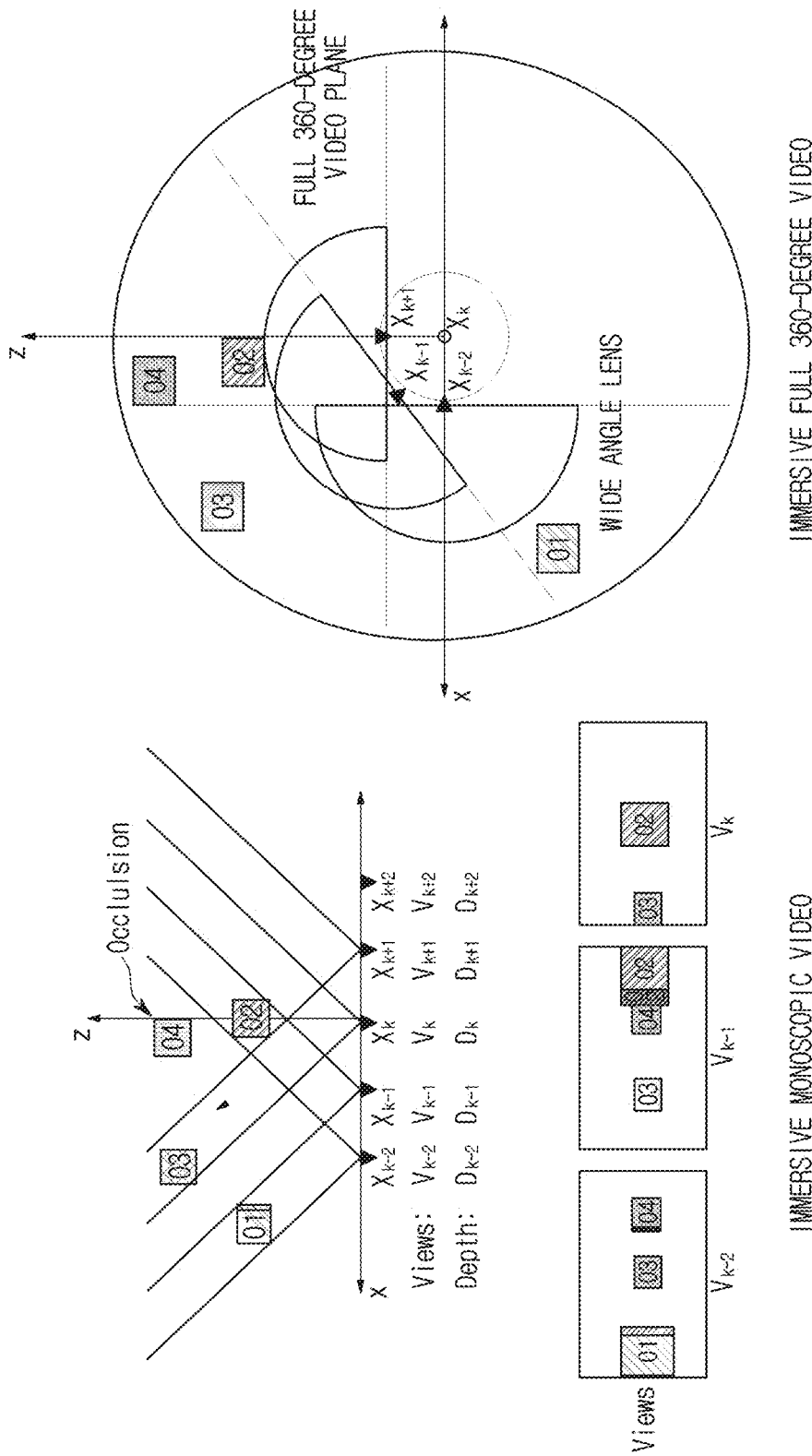
FIG. 1 is a view showing a concept of a multi-view image in an immersive video according to an embodiment of the present disclosure.

A variety of modifications may be made to the present disclosure and there are various embodiments of the present disclosure, examples of which will now be provided with reference to drawings and described in detail. However, the present disclosure is not limited thereto, although the exemplary embodiments can be construed as including all modifications, equivalents, or substitutes in a technical concept and a technical scope of the present disclosure. In the drawings, a similar reference numeral refers to a same or similar function in various aspects. In the drawings, the shapes and dimensions of elements may be exaggerated for clarity. In the following detailed description for exemplary embodiments, references are made to the accompanying drawings that show, by way of illustration, specific embodiments. These embodiments are described in sufficient detail to enable those skilled in the art to implement the embodiments. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the embodiment. The following detailed description is, therefore, not to be taken in a limiting sense, and the scope of the exemplary embodiments is defined only by the appended claims, appropriately interpreted, along with the full range of equivalents to what the claims claim.

Terms used in the present disclosure, 'first', 'second', etc. may be used to describe various components, but the components are not to be construed as being limited to the terms. The terms are only used to differentiate one component from other components. For example, the 'first' component may be named the 'second' component without departing from the scope of the present disclosure, and the 'second' component may also be similarly named the 'first' component. The term 'and/or' includes a combination of a plurality of relevant items or any one of a plurality of relevant terms.

When an element is simply referred to as being 'connected to' or 'coupled to' another element in the present disclosure, it should be understood that the former element is directly connected to or directly coupled to the latter element or the former element is connected to or coupled to the latter element, having yet another element intervening therebetween. In contrast, it should be understood that when an element is referred to as being "directly coupled" or "directly connected" to another element, there are no intervening elements present.

As constitutional parts shown in the embodiments of the present disclosure are independently shown so as to represent characteristic functions different from each other, it does not mean that each constitutional part is a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present disclosure, if not departing from the essence of the present disclosure.

The terms used in the present disclosure are merely used to describe particular embodiments, while not being intended to limit the present disclosure. An expression used in the singular encompasses the one in the plural, unless they have clearly different meanings from the context. In the present disclosure, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific configuration is referred to as being "included", other configurations than the configuration are not excluded, but additional elements may be included in the embodiments of the present disclosure or the technical scope of the present disclosure.

In addition, some of constituents may not be indispensable constituents performing essential functions of the present disclosure but be selective constituents improving only performance thereof. The present disclosure may be implemented by including only the indispensable constitutional parts for realizing the essence of the present disclosure except other constituents used merely for improving performance A structure including only the indispensable constituents except the selective constituents used only for improving performance is also included in the scope of right of the present disclosure.

Also, in the present disclosure, image and video may be used interchangeably.

Hereinafter, embodiments of the present disclosure will be described in detail with reference to the accompanying drawings. In describing exemplary embodiments of the present specification, well-known functions or constructions will not be described in detail when they might unnecessarily obscure the understanding of the present specification, same constituent elements in drawings are denoted by same reference numerals, and a repeated description of the same elements will be omitted.

FIG. 1 is a view showing a concept of a multi-view image in an immersive video according to an embodiment of the present disclosure. Referring to FIGS. 1, 01 to 04 may represent a region of an image in an arbitrary scene, Vk may represent an image obtained at a camera center position, Xk may represent a view position (camera position), and Dk may represent depth information at a camera center position. In an immersive video, an image may be generated at a plurality of positions in various directions in order to support 6 degrees of freedom according to a viewer's movement. An immersive video may consist of an omnidirectional image and relevant spatial information (depth information, camera information). An immersive video may be transmitted to a terminal side through image compression and a packet multiplexing process.

An immersive video system may obtain, generate, transmit and reproduce a large immersive video consisting of multi views. Accordingly, an immersive video system should effectively store and compress massive image data and be compatible with an existing immersive video (3DoF).

Figure 2A:
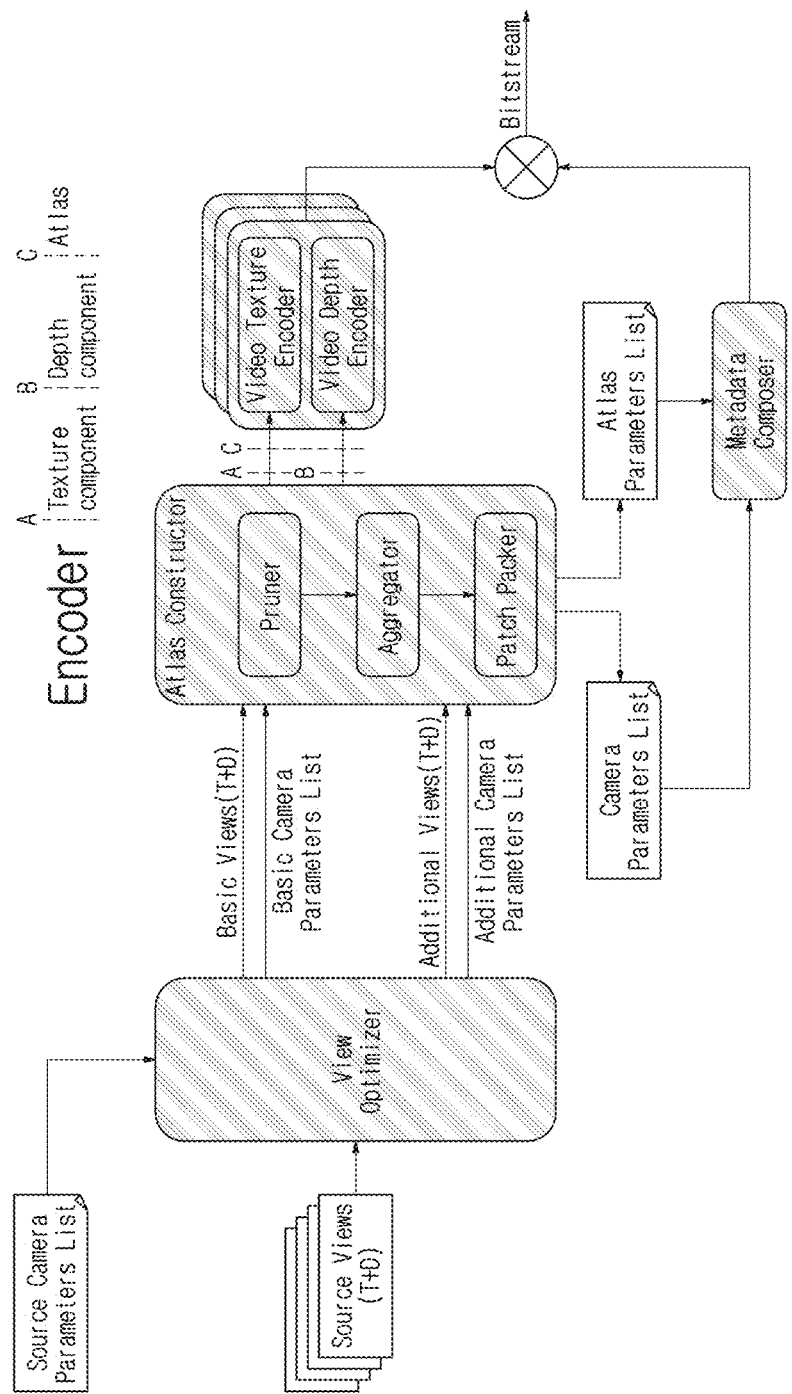
FIG. 2A and FIG. 2B are views schematically showing TMIV (Test Model for Immersive Video) encoder and decoder according to an embodiment of the present disclosure.
Figure 2B:
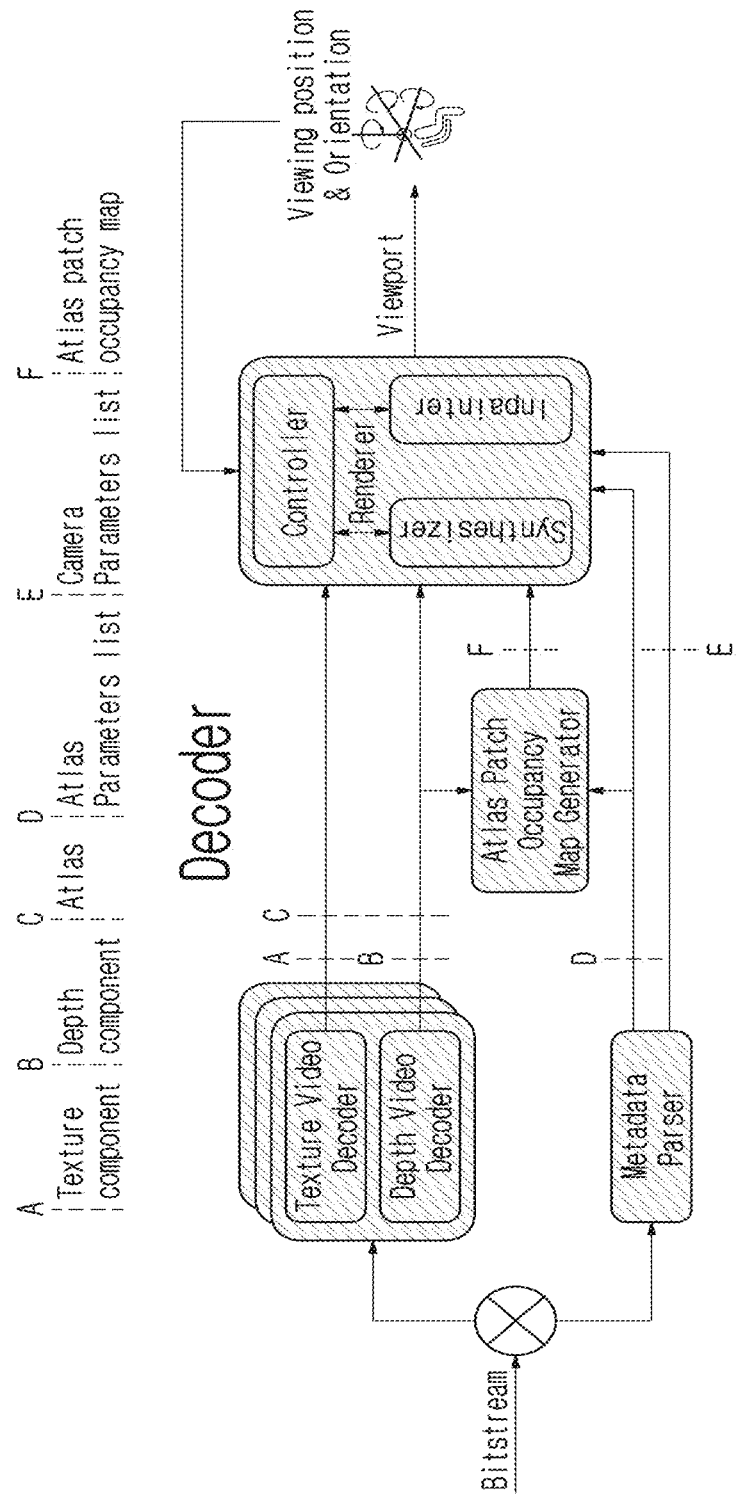

FIG. 2A and FIG. 2B are views schematically showing TMIV (Test Model for Immersive Video) encoder and decoder according to an embodiment of the present disclosure. Referring to FIG. 2A, an input of a TMIV encoder may be encoded sequentially through a view optimizer, an atlas constructor, a video texture encoder and a video depth encoder. The view optimizer may determine the number of necessary basic views by considering a directional bias, a view, a distance, and an overlap of views. Next, a basic view may be selected by considering a position between views and an overlap between them. A pruner in the atlas constructor may preserve basic views by using a mask and remove an overlapping portion of additional views. An aggregator may update a mask used for a video frame in a chronological order. Next, a patch packer may ultimately generate an atlas by packing each patch atlas. An atlas of a basic view may configure same texture and depth information as the original. An atlas of an additional view may have texture and depth information in a block patch form.

Referring to FIG. 2B, a TMIV decoder may reconstruct an atlas and a basic view for video texture and depth information. In addition, a reconstructed output may be ultimately generated through an atlas patch occupancy map generator and a renderer. Specifically, a bitstream may be forwarded to the TMIV decoder. In addition, texture and depth may be transmitted to the renderer via a texture video decoder and a depth video decoder. The renderer may be configured in three stages of controller, synthesizer and inpainter.

Figure 3:
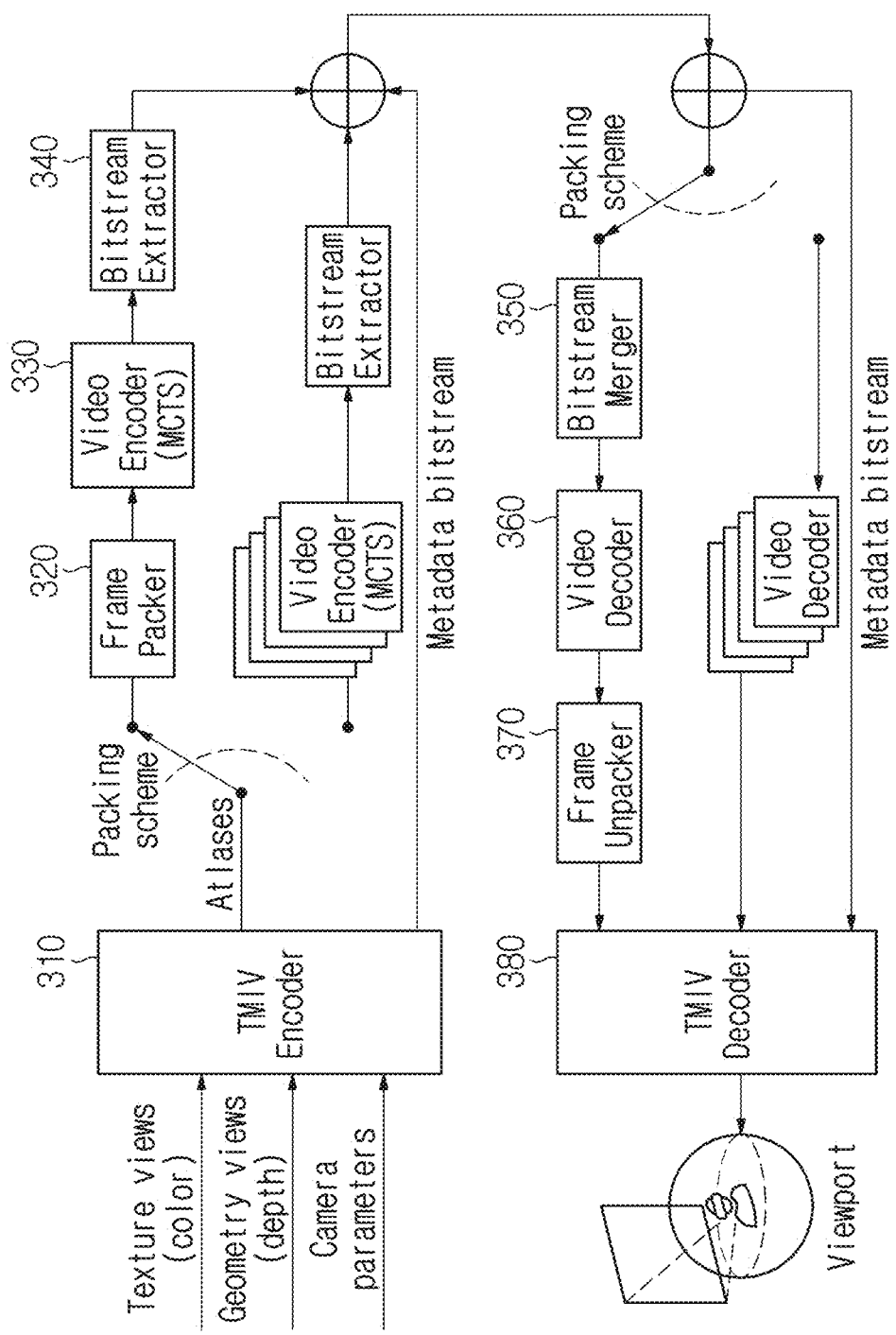
FIG. 3 is a view schematically showing an apparatus for performing frame packing according to an embodiment of the present disclosure.

FIG. 3 is a view schematically showing an apparatus for performing frame packing according to an embodiment of the present disclosure. Frame packing may have a same meaning as atlas merging. In addition, frame packing may have a same meaning as bitstream merging. A frame may be generated by merging an atlas. Geometry may mean depth. Frame and picture may have a same meaning. The present disclosure may provide MPEG immersive video (MIV)-specific tiling, merging and frame packing methods and a test result to be described. The present disclosure may provide a pixel domain and compressed domain frame packing for merging atlas sub-bitstreams into a single bitstream. BD-rate may be improved by using the frame packing method of the present disclosure. In addition, one HEVC level 6.2 decoder or multiple HEVC level 5.2 decoders may be used depending on hardware. The frame packing method of the present disclosure may reduce a BD-rate, thereby improving image quality. In addition, the frame packing method of the present disclosure may reduce the number of decoder instances for decoder synchronization. A coded video substream according to the present disclosure may forward frame-packed texture, geometry and potential occupancy data in a pixel domain. The present disclosure may provide a variety of solutions for texture and geometry irrespective of pixel domain frame packing.

Referring to FIG. 3, a TMIV encoder 310 may receive a texture view, a geometry view, and a camera parameter. In addition, the TMIV encoder 310 may forward atlases to a frame packer 320. Herein, each atlas may be frame packed according to a packing method, and location information of each frame-packed atlas may be recorded in an MIV metadata bitstream. Next, each video may be encoded using a motion-constrained tile set (MCTS) encoder 330, and another tile or subpicture division method may be applied according to a packing method. The MCTS encoder 330 may transmit a bitstream to a bitstream extractor 340. Each tile or subpicture may be extracted from a bitstream and be transmitted to a bitstream merger 350. When a packing method requires merge, the bitstream merger 350 may merge a tile bitstream or a subpicture bitstream in an compression domain in order to reduce the number of instances of a decoder. In addition, the bitstream merger 350 may forward a merged bitstream to a video decoder 360. After decoding in the video decoder 360, a frame unpacker 370 may decompress a frame-packed picture and forward the decompressed picture to a TMIV decoder 380. The TMIV decoder 380 may provide a reconstructed image to a user through a viewport. Herein, in the frame unpacker 370, a decompression process of an MIV metadata bitstream, on which location information of each frame-packed atlas is recorded, may be skipped. In addition, the TMIV decoder 380 may analyze the MIV metadata bitstream and perform image reconstruction using a picture that is decoded by the video decoder 360. A frame packing and reconstruction method of the present disclosure is not limited to the above embodiment. At least one or more processes of subpicture or tile division, subpicture or tile extraction, and subpicture or tile merging may be performed in the frame packer 320, the MCTS encoder 330, the bitstream extractor 340, or the bitstream merger 350.

In order to implement the present disclosure, tile or subpicture division, tile or subpicture extraction, and tile or subpicture merge may be required. The present disclosure may provide 4 MIV-specific non-uniform tile division and merging methods that divide patches of each basic view and additional views for quality management by using an MCTS encoder. For tile or subpicture merge, HEVC test model (HM) and VVC test model (VTM)-based tile or subpicture merge software may be used in the present disclosure. In addition, since a current HM does not support individual quantization parameter allocations according to each tile/slice, Kvazaar, which is an open source HEVC encoder, may be used to encode a frame-packed video. However, Kvazaar may have 2 differences from the HM. First, although the packing method shows a BD-rate benefit in the HM, Kvazaar may not always guarantee a same or similar BD-rate benefit. One of the reasons for the first difference is that early termination for encoding acceleration may cause such a difference. Second, HM software cannot extract a tile or a subpicture from an MCTS bitstream which is generated by Kvazaar. A reason for the second difference is that, while an HM tile or subpicture extractor can generate an output tile bitstream by parsing an extraction information set SEI message, Kvazaar cannot generate any extraction information set SEI message. Accordingly, HM-based tile or subpicture extraction software using a slice division address may be used in the present disclosure. In addition, Kvazaar may use an efficient and simplified uniform frame packing and tile or subpicture division method.

Figure 4:
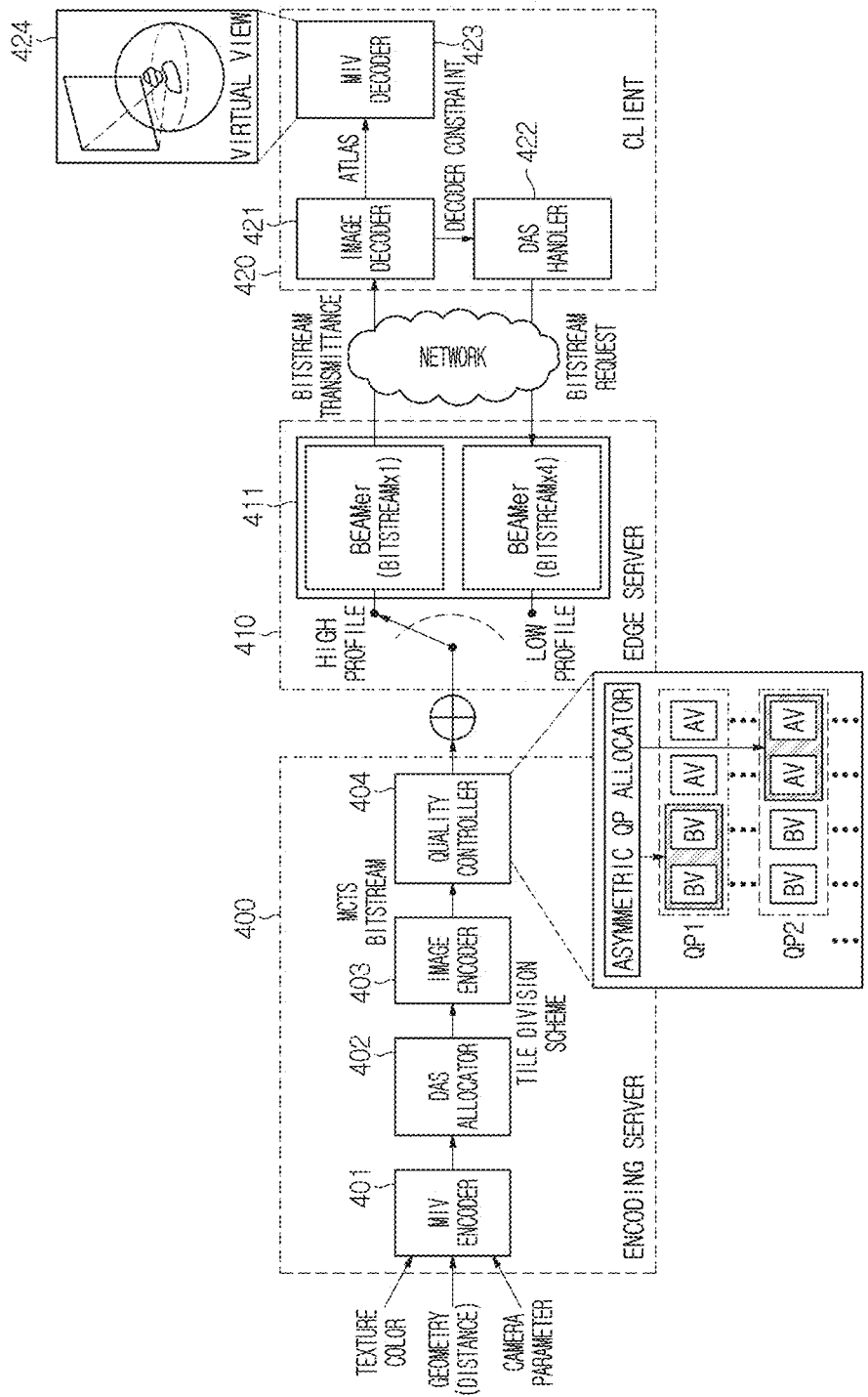
FIG. 4 is a view schematically showing an apparatus for performing frame packing according to another embodiment of the present disclosure.

FIG. 4 is a view schematically showing an apparatus for performing frame packing according to another embodiment of the present disclosure. Referring to FIG. 4, the apparatus for performing frame packing may include an encoding server 400, an MIV encoder 401, a decoder-adaptive subpicture (DAS) allocator 402, an image encoder 403, a quality controller 404, an edge server 410, a bitstream extractor and merger (BEAMer) 411, a client 420, an image decoder 421, a DAS handler 422, an MIV decoder 423, and a head mounted image device 424. The number of respective components is merely exemplary, and the present disclosure is not limited thereto. The encoding server 400 may encode an immersive video, which is obtained from at least one or more three-dimensional cameras, into a video with desired quality by applying a division method based on at least one of subpicture and tile. In addition, the encoding server 400 may apply quality control to the immersive video and transmit the video to the edge server 410. The MIV encoder 401 may classify the immersive video into a basic view and an additional view and generate a residual image by removing spatial redundancy from an additional view image. In addition, the MIV encoder 401 may generate atlases for the basic view and the additional view. A residual image may be extracted in patches and be stored in an atlas, and information on each patch may be encoded as metadata and be stored in an MIV bitstream. An atlas for the basic view and an atlas for the additional view may consist of 2 textures and 2 downsampled geometries. However, the present disclosure is not limited thereto.

The DAS allocator 402 may divide an atlas based on at least one of tile and subpicture. In addition, the DAS allocator 402 may divide an atlas by considering bitstream merge and quality control and may forward a divided atlas to the image encoder 403. The image encoder 403 may encode an atlas into desired quality according to a division structure of subpicture or tile. Accordingly, a motion-constrained tile set (MCTS) bitstream may be generated which includes a plurality of tiles or subpictures capable of being independently extracted and decoded in a single bitstream. The MCTS bitstream and a bit rate of each subpicture or tile bitstream may be forwarded to the quality controller 404. The quality controller 404 may analyze a ratio between a basic view and an additional view within the MCTS bitstream. In addition, the quality controller 404 may asymmetrically allocate high quality to a tile or a subpicture with a high ratio of the basic view and low quality to a tile or a subpicture with a high ratio of the additional view. The MCTS bitstream and the MIV bitstream, to which quality is allocated asymmetrically, may be forwarded to the edge server 410.

The edge server 410 may extract a tile or subpicture bitstream from the MCTS bitstream, merge and transmit the tile or subpicture bitstream according to a profile to the client 420 and also transmit the MIV bitstream to the client 420. The bitstream extractor and merger (BEAMer) 411 may merge the MCTS bitstream into one or multiple bitstreams according to a profile and transmit the one or multiple bitstreams to the client 420. The BEAMer 411 may adaptively merge a bitstream according to a decoder level of the client 420. In addition, in order to reflect a patch position in an atlas according to a merged image, patch information of the MIV bitstream may be modified and transmitted to the client. However, the present disclosure is not limited to the above embodiment.

The client 420 may request decoder-adaptive subpicture or tile bitstreams according to the computing power of the image decoder 421 to the edge server 410. In addition, the client 420 may decode merged bitstreams received from the edge server 410, generate a virtual view image corresponding to a user view and display the virtual view image on the head mounted image device 424. The image decoder 421 may decode merged bitstreams received from the edge server 410 and forward the decoded bitstreams to the MIV decoder 423. The computing power of the image decoder 421 may be calculated into a quantitative value like a level and be forwarded to the DAS handler 422. The DAS handler 422 may calculate a maximum size of image information to be decoded by considering the computing power of the image decoder 421 and may forward the image information to the edge server 410. The image information may include a resolution, the number of bits, a frame rate, and codec information. The MIV decoder 423 may generate a virtual view image corresponding to a user view by using a decoded image and an MIV bitstream and may forward the virtual view image to the head mounted image device 424. The head mounted image device 424 may forward the virtual view image to the user by displaying the virtual view image on the screen. However, the present disclosure is not limited to the above embodiment. At least one or more processes of subpicture or tile division, subpicture or tile extraction, and subpicture or tile merging may be performed in the encoding server 400, the edge server 410, or the client 420.

Figure 5:
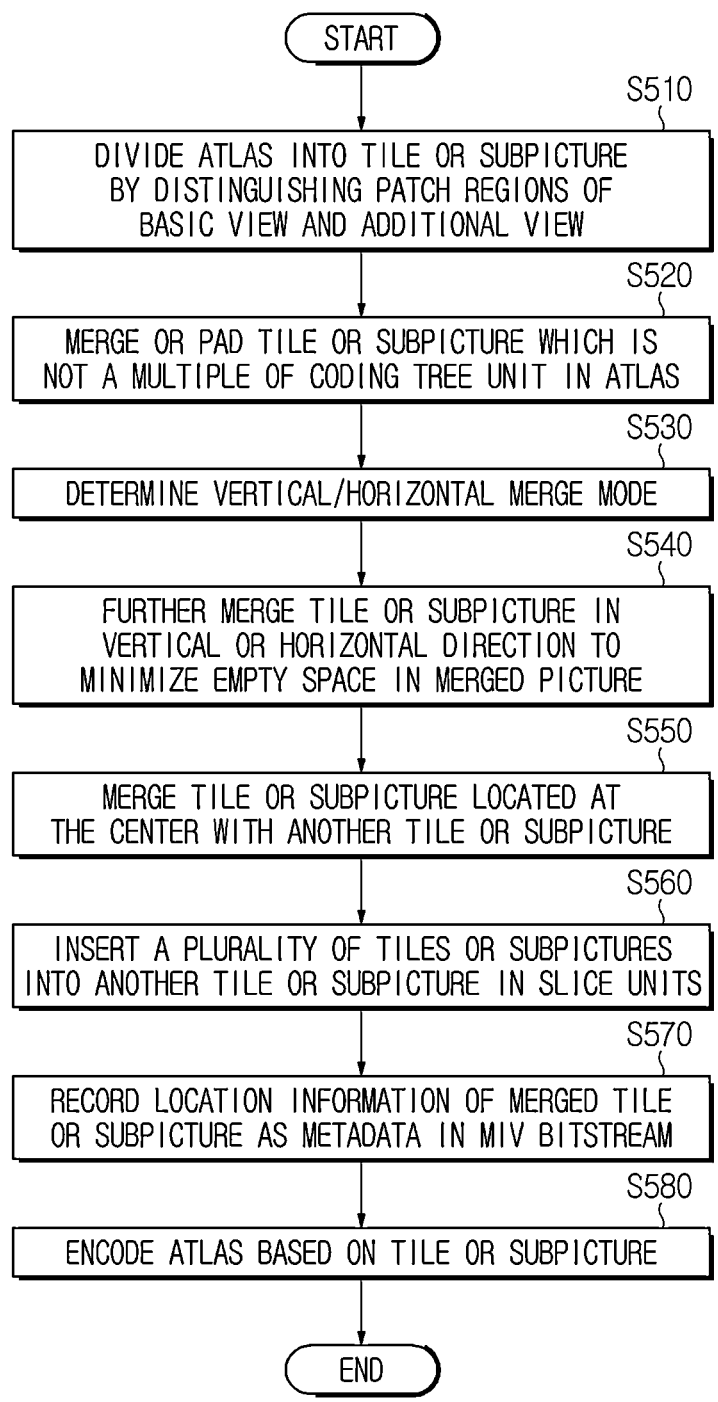
FIG. 5 shows an example process of dividing, merging and encoding an atlas based on a tile or a subpicture according to an embodiment of the present disclosure.

FIG. 5 shows an example process of dividing, merging and encoding an atlas based on a tile or a subpicture according to an embodiment of the present disclosure. Referring to FIG. 5, an atlas may be divided into tiles or subpictures by distinguishing patch regions of a basic view and an additional view in an immersive video which is obtained from at least one or more three-dimensional cameras (S510). In addition, a tile or subpicture, which is not a multiplied size of a coding tree unit (CTU) in an atlas, may be merged with another tile or subpicture, or pixel padding may be applied (S520). Accordingly, every tile or subpicture may be constructed by a multiple of CTU. Exceptionally, even when the height or width of a tile or subpicture located on a last row or column is not a multiple of CTU, it may be extracted, merged and decoded. In addition, a vertical/horizontal merge mode may be determined (S530). A merged picture with a size exceeding a value determined by an image decoder may be impossible to decode. Accordingly, a merge mode may be determined by considering the width and height of an atlas. When a width of an atlas is larger than a height, a tile or a subpicture may be merged in vertical direction. When a height of an atlas is larger than a width, a tile or a subpicture may be merged in horizontal direction.

In addition, in order to minimize an empty space in a merged picture, a tile or a subpicture may be further divided in vertical or horizontal direction (S540). In addition, a tile or a subpicture located at the center of an atlas may be merged with another tile or subpicture (S550). However, only when a tile or a subpicture located at the center is smaller than a tile or a subpicture located below, the tile or the subpicture located at the center may be merged with another tile or subpicture. This is because, when a tile or a subpicture located at the center is smaller than a tile or a subpicture located below, tile or subpicture merge and decoding may be impossible. In addition, a plurality of tiles or subpictures may be inserted into another tile or subpicture in a slice unit (S560). A plurality of small tiles or subpictures may be arranged and inserted in one tile or subpicture space either vertically or horizontally. Accordingly, an empty space within a merged picture may be minimized. In addition, location information of a merged tile or subpicture may be recorded as metadata in an MIV bitstream (S570). Since a patch position in an atlas is changed during merge, patch position information may also be recorded as metadata in an MIV bitstream. In addition, the atlas may be encoded based on a tile or a subpicture (S580). The atlas may be encoded by reflecting a determined tile or subpicture division structure and be stored in a bitstream form.

The method of dividing, merging and encoding an atlas based on a tile or subpicture described with reference to FIG. 5 is merely exemplary, and a method of dividing, merging and encoding an atlas based on a tile or subpicture according to the present disclosure is not limited to the example illustrated in FIG. 5. For example, some of the steps shown in FIG. 5 may be skipped, and a step other than those shown in FIG. 5 may be added to any position on the flowchart of FIG. 5. In addition, some of the steps illustrated in FIG. 5 may be performed with another step simultaneously or may be switched with another step in order.

Figure 6:
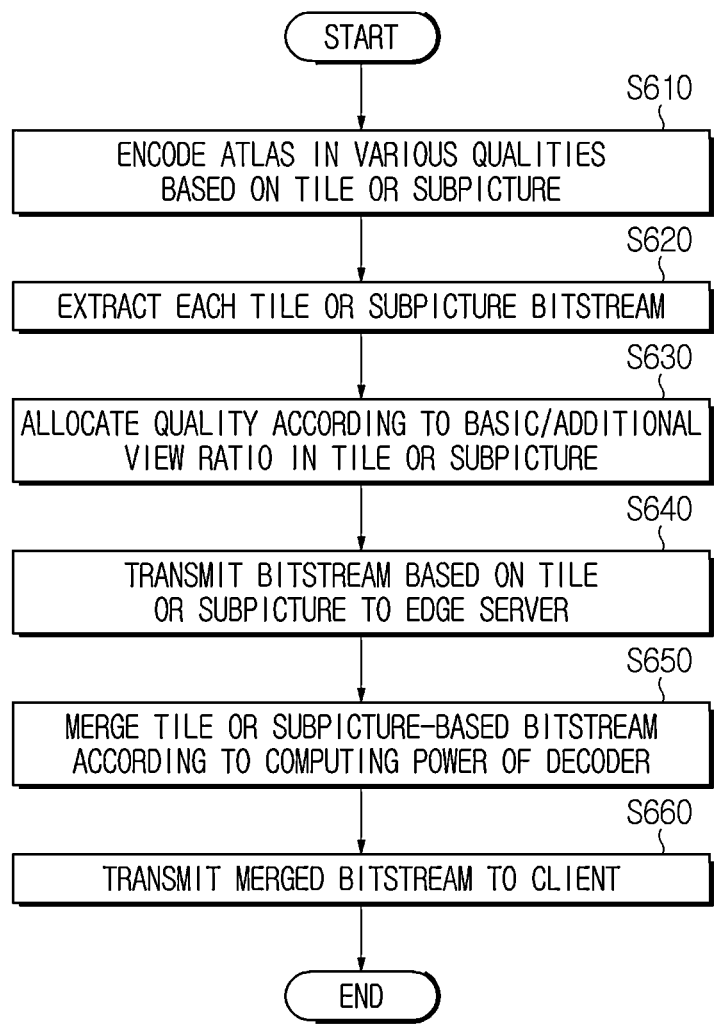
FIG. 6 shows an example process of asymmetrically allocating quality to and merging a tile or a subpicture in an atlas according to an embodiment of the present disclosure.

FIG. 6 shows an example process of asymmetrically allocating quality to and merging a tile or a subpicture in an atlas according to an embodiment of the present disclosure. Referring to FIG. 6, an atlas may be encoded with various qualities based on a tile or a subpicture (S610). An atlas may be encoded by rates, which represent 5 particular bandwidths, and corresponding quantization parameters. Accordingly, a bitstream may be generated. In addition, each tile or subpicture bitstream may be extracted from a bitstream in which the atlas is encoded (S620). In addition, quality may be allocated according to a ratio of a basic view and an additional view in a tile or subpicture (S630). When the basic view has a high ratio, a high quality may be allocated to a tile or a subpicture. When the additional view has a high ratio, a low quality may be allocated to a tile or a subpicture. In addition, a tile or subpicture-based bitstream may be transmitted to an edge server (S640). In addition, according to the computing power of a decoder, a tile or subpicture-based bitstream may be merged (S650). In addition, a merged bitstream may be transmitted to a client (S660).

The method of asymmetrically allocating quality to a tile or subpicture in an atlas and of merging, as described with reference to FIG. 6, is merely exemplary, and a method of asymmetrically allocating quality to a tile or subpicture in an atlas according to the present disclosure and of merging is not limited to the example illustrated in FIG. 6. For example, some of the steps shown in FIG. 6 may be skipped, and a step other than those shown in FIG. 6 may be added to any position on the flowchart of FIG. 6. In addition, some of the steps illustrated in FIG. 6 may be performed with another step simultaneously or may be switched with another step in order.

Figure 7:
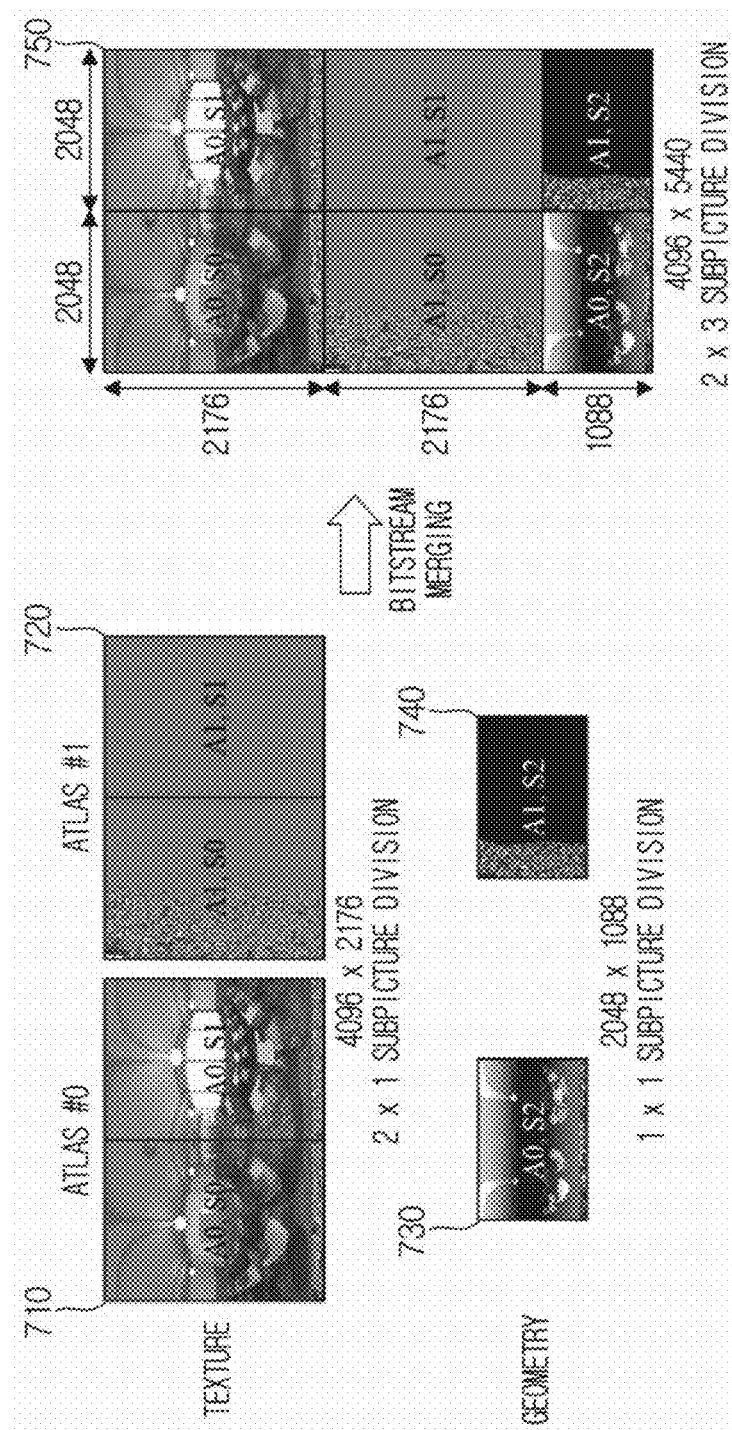
FIG. 7 is a view showing an example of packing a frame by dividing and merging non-uniformly an atlas in a subpicture unit according to an embodiment of the present disclosure.

FIG. 7 is a view showing an example of packing a frame by dividing and merging non-uniformly an atlas in a subpicture unit according to an embodiment of the present disclosure. Pixel domain frame packing may have an effect of reducing the number of decoder instances. For example, while 4 HEVC level 5.2 bitstreams are generated from MIV and MIV view anchors, one HEVC level 6.2 bitstream may be generated from frame packing. However, frame packing-based MIV implementation may be difficult in a legacy system which has no function of decoding a HEVC level 6.2 bitstream. Accordingly, a subdivided packing method capable of covering the legacy system may be required. As for the subdivided packing method, there may exist a method of encoding atlases using tiles or subpictures, extracting individual tiles or subpictures, and merging tiles or subpictures into a single bitstream in a compressed domain. A tile or subpicture division scheme may be designed by considering the following two requirements. First, each basic view and each additional view should be distinguished by tile or subpicture boundaries, and implementation of selective streaming may be performed accordingly. Second, in order to prevent an empty space from being generated in a merged bitstream, a tile or a subpicture should be divided, and no pixel ratio may be wasted accordingly. A tiling and merging method satisfying the two requirements may be suitable for an MIV test sequence.

For an MIV test sequence, there may be four MIV-specific tile or subpicture division and merging methods. As a result generated by the four methods, a bitstream may be compatible with an HEVC/VVC decoder. In order to prevent an empty space from being made in a merged bitstream, two input tiles/slices may be located vertically in a single output tile. In addition, this may satisfy a tile constraint of HEVC/VVC. A test for the present disclosure was carried out according to an MIV common test condition (CTC), but as the VvenC does not fully support tile and subpicture encoding, an HM and a VTM may be used in encoding and decoding.

Referring to FIG. 7, a texture atlas A0 710 for a basic view, a texture atlas A1 720 for an additional view, a geometry atlas A0 730 for a basic view, and a geometry atlas A1 740 for an additional view may be forwarded through an MIV encoder. The texture atlas A0 710 for a basic view and the texture atlas A1 720 for an additional view may have a size corresponding to a 4096×2176 pixel unit. In addition, the geometry atlas A0 730 for a basic view and the geometry atlas A1 740 for an additional view may have a size corresponding to a 2048×1088 pixel unit. However, sizes of atlases are not limited to the above embodiment. The texture atlas A0 710 for a basic view may be divided and extracted in subpicture units S0 and S1. The texture atlas A1 720 for an additional view may also be divided and extracted in subpicture units S0 and S1. The geometry atlas A0 730 for a basic view may be divided and extracted in a subpicture unit S2. The geometry atlas A1 740 for an additional view may also be divided and extracted in a subpicture unit S2. When a subpicture in each atlas is not a multiple of a CTU size, pixel padding may be generated in the atlas. In addition, in order to prevent an empty space from being generated, a merging method may be determined in a subpicture unit. A merging method may be determined by considering the horizontal and vertical sizes and resolution of an atlas. There may be a vertical merge mode and a horizontal merge mode in the merging method. However, apart from the vertical/horizontal merge modes, there may be a variety of merge modes. In addition, high quality may be allocated to the subpictures S0 and S1 in the texture atlas A0 710 for a basic view and to the subpicture S2 in the geometry atlas A0 730 for a basic view, and low quality may be allocated to the subpictures S0 and S1 in the texture atlas A1 720 for an additional view and to the subpicture S2 in the geometry atlas A1 740 for an additional view. Thus, efficient quality allocation may be performed.

According to another embodiment, the texture atlas A0 710 for a basic view, the texture atlas A1 720 for an additional view, the geometry atlas A0 730 for a basic view, and the geometry atlas A1 740 for an additional view may be divided and extracted in a tile unit. In addition, a merging method may be determined in a tile unit. In addition, high quality may be allocated to tiles in the texture atlas A0 710 for a basic view and to a tile in the geometry atlas A0 730 for a basic view, and low quality may be allocated to tiles in the texture atlas A1 720 for an additional view and to a tile in the geometry atlas A1 740 for an additional view. Thus, efficient quality allocation may be performed.

According to a determined merge mode, the texture atlas A0 710 for a basic view, the texture atlas A1 720 for an additional view, the geometry atlas A0 730 for a basic view, and the geometry atlas A1 740 for an additional view may be merged in a subpicture unit so that a merged frame 750 may be generated. A size of the merged frame 750 may correspond to a 4096×5440 pixel unit. However, the size of the merged frame 750 is not limited to the above embodiment. In the merged frame 750, there may be 6 subpictures and there may be no empty space.

According to another embodiment, according to the determined merge mode, the texture atlas A0 710 for a basic view, the texture atlas A1 720 for an additional view, the geometry atlas A0 730 for a basic view, and the geometry atlas A1 740 for an additional view may be merged in a tile unit so that the merged frame 750 may be generated. In the merged frame 750, there may be 6 tiles and there may be no empty space.

Figure 8:
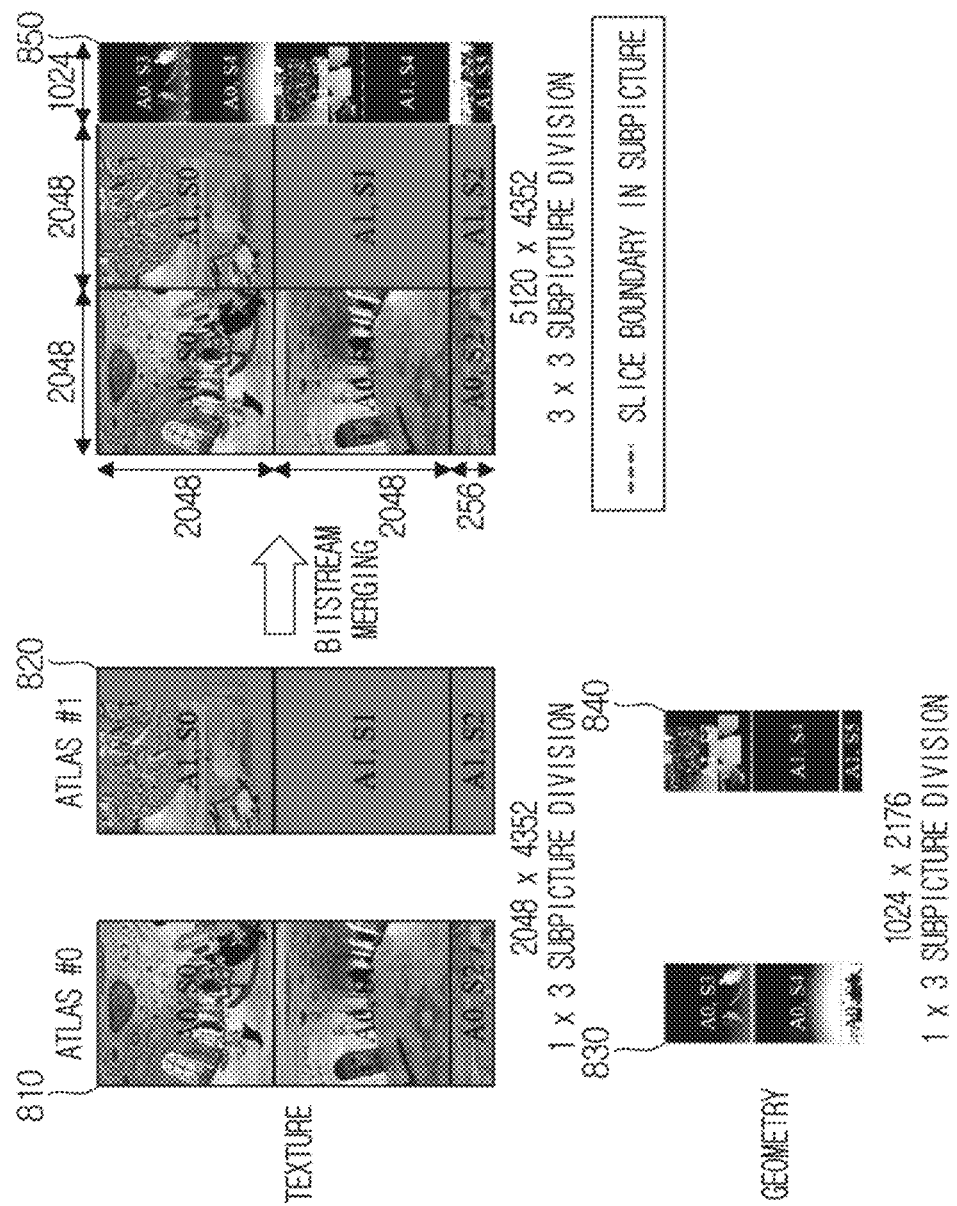
FIG. 8 is a view showing an example of packing a frame by dividing and merging non-uniformly an atlas in a subpicture unit according to another embodiment of the present disclosure.

FIG. 8 is a view showing an example of packing a frame by dividing and merging non-uniformly an atlas in a subpicture unit according to another embodiment of the present disclosure. Referring to FIG. 8, a texture atlas A0 810 for a basic view, a texture atlas A1 820 for an additional view, a geometry atlas A0 830 for a basic view, and a geometry atlas A1 840 for an additional view may be forwarded through an MIV encoder. The texture atlas A0 810 for a basic view and the texture atlas A1 820 for an additional view may have a size corresponding to a 2048×4352 pixel unit. In addition, the geometry atlas A0 830 for a basic view and the geometry atlas A1 840 for an additional view may have a size corresponding to a 1024×2176 pixel unit. However, sizes of atlases are not limited to the above embodiment. The texture atlas A0 810 for a basic view may be divided and extracted in subpicture units S0, S1 and S2. The texture atlas A1 820 for an additional view may also be divided and extracted in subpicture units S0, S1 and S2. The geometry atlas A0 830 for a basic view may be divided and extracted in subpicture units S3, S4 and S5. The geometry atlas A1 840 for an additional view may also be divided and extracted in subpicture units S3, S4 and S5. When a subpicture in each atlas is not a multiple of a CTU size, pixel padding may be generated in the atlas. In addition, in order to prevent an empty space from being generated, a merging method may be determined in a tile unit. A merging method may be determined by considering the horizontal and vertical sizes and resolution of an atlas. There may be a vertical merge mode and a horizontal merge mode in the merging method. However, apart from the vertical/horizontal merge modes, there may be a variety of merge modes. In addition, high quality may be allocated to the subpictures S0, S1 and S2 in the texture atlas A0 810 for a basic view and to the subpictures S3, S4 and S5 in the geometry atlas A0 830 for a basic view, and low quality may be allocated to the subpictures S0, S1 and S2 in the texture atlas A1 820 for an additional view and to the subpicture S3, S4 and S5 in the geometry atlas A1 840 for an additional view. Thus, efficient quality allocation may be performed.

According to another embodiment, the texture atlas A0 810 for a basic view, the texture atlas A1 820 for an additional view, the geometry atlas A0 830 for a basic view, and the geometry atlas A1 840 for an additional view may be divided and extracted in a tile unit. In addition, a merging method may be determined in a tile unit. In addition, high quality may be allocated to tiles in the texture atlas A0 810 for a basic view and to tiles in the geometry atlas A0 830 for a basic view, and low quality may be allocated to tiles in the texture atlas A1 820 for an additional view and to tiles in the geometry atlas A1 840 for an additional view. Thus, efficient quality allocation may be performed.

According to a determined merge mode, the texture atlas A0 810 for a basic view, the texture atlas A1 820 for an additional view, the geometry atlas A0 830 for a basic view, and the geometry atlas A1 840 for an additional view may be merged in a subpicture unit so that a merged frame 850 may be generated. A size of the merged frame 850 may correspond to a 5120×4352 pixel unit. However, the size of the merged frame 850 is not limited to the above embodiment. In the merged frame, there may be 9 subpictures and there may be no empty space. In the merged frame 850, a boundary between the subpicture S3 and the subpicture S4 in the geometry atlas A0 830 for a basic view may correspond to a slice boundary in a subpicture. Also, in the merged frame 850, the subpicture S3 and the subpicture S4 in the geometry atlas A0 830 for a basic view may correspond to a single subpicture. In the merged frame 850, a boundary between the subpicture S3 and the subpicture S4 in the geometry atlas A1 840 for an additional view may correspond to a slice boundary in a subpicture. Also, in the merged frame 850, the subpicture S3 and the subpicture S4 in the geometry atlas A1 840 for an additional view may correspond to a single subpicture. In the merged frame 850, a boundary between the subpicture S5 in the geometry atlas A0 830 for a basic view and the subpicture S5 in the geometry atlas A1 840 for an additional view may correspond to a slice boundary in a subpicture. Also, in the merged frame 850, the subpicture S5 in the geometry atlas A0 830 for a basic view and the subpicture S5 in the geometry atlas A1 840 for an additional view may correspond to a single subpicture.

According to another embodiment, according to a determined merge mode, the texture atlas A0 810 for a basic view, the texture atlas A1 820 for an additional view, the geometry atlas A0 830 for a basic view, and the geometry atlas A1 840 for an additional view may be merged in a tile unit so that the merged frame 850 may be generated. In the merged frame 850, there may be 9 tiles and there may be no empty space.

Figure 9:
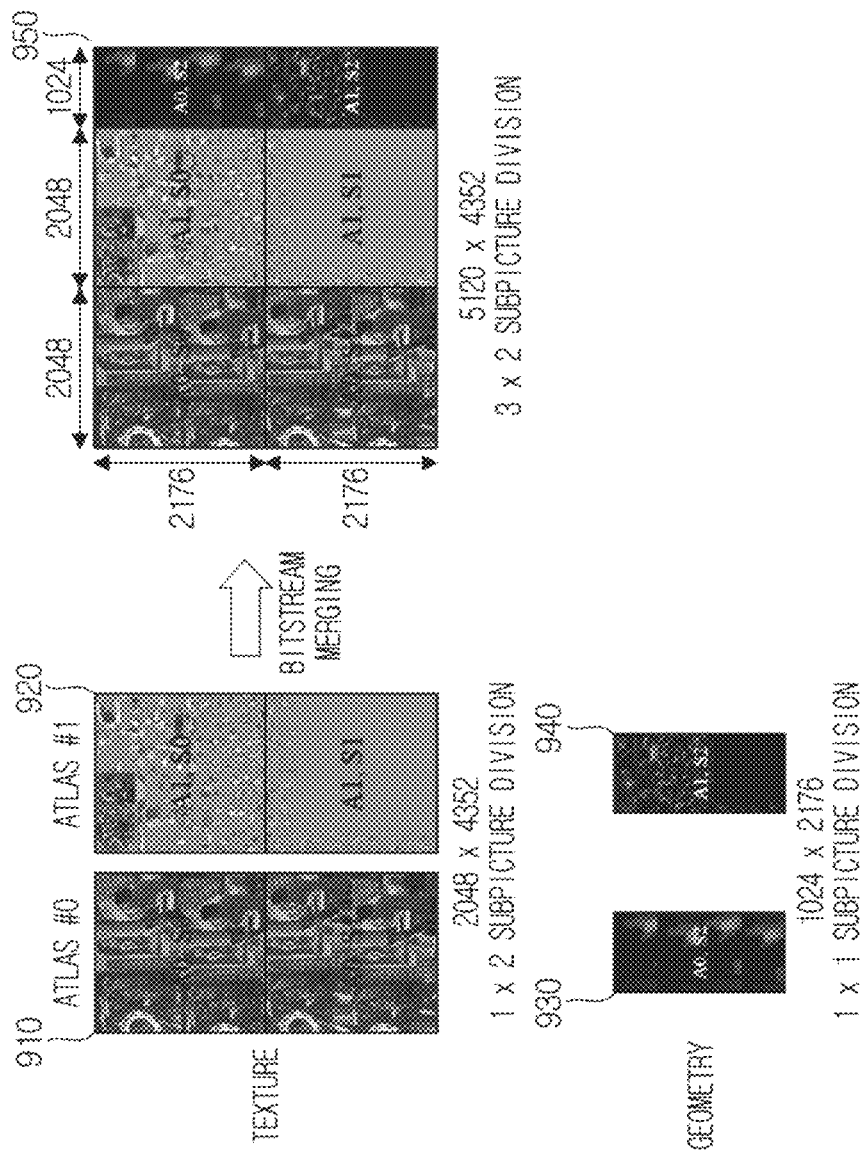
FIG. 9 is a view showing an example of packing a frame by dividing and merging non-uniformly an atlas in a subpicture unit according to yet another embodiment of the present disclosure.

FIG. 9 is a view showing an example of packing a frame by dividing and merging non-uniformly an atlas in a subpicture unit according to yet another embodiment of the present disclosure. Referring to FIG. 9, a texture atlas A0 910 for a basic view, a texture atlas A1 920 for an additional view, a geometry atlas A0 930 for a basic view, and a geometry atlas A1 940 for an additional view may be forwarded through an MIV encoder. The texture atlas A0 910 for a basic view and the texture atlas A1 920 for an additional view may have a size corresponding to a 2048× 4352 pixel unit. In addition, the geometry atlas A0 930 for a basic view and the geometry atlas A1 940 for an additional view may have a size corresponding to a 1024×2176 pixel unit. However, sizes of atlases are not limited to the above embodiment. The texture atlas A0 910 for a basic view may be divided and extracted in subpicture units S0 and S1. The texture atlas A1 920 for an additional view may also be divided and extracted in subpicture units S0 and S1. Herein, the texture atlas A0 910 for a basic view and the texture atlas A1 920 for an additional view may be uniformly divided, and the subpictures S0 and S1 in the texture atlas A0 930 for a basic view and the texture atlas A1 920 for an additional view may have a same size. The geometry atlas A0 930 for a basic view may be divided and extracted in a subpicture unit S2. The geometry atlas A1 940 for an additional view may also be divided and extracted in a subpicture unit S2. In addition, in order to prevent an empty space from being generated, a merging method may be determined in a subpicture unit. A merging method may be determined by considering the horizontal and vertical sizes and resolution of an atlas. There may be a vertical merge mode and a horizontal merge mode in the merging method. However, apart from the vertical/horizontal merge modes, there may be a variety of merge modes. When a subpicture in each atlas is not a multiple of a CTU size, pixel padding may be generated in the atlas.

In addition, high quality may be allocated to the subpictures S0 and S1 in the texture atlas A0 910 for a basic view and to the subpicture S2 in the geometry atlas A0 930 for a basic view, and low quality may be allocated to the subpictures S0 and S1 in the texture atlas A1 920 for an additional view and to the subpicture S2 in the geometry atlas A1 940 for an additional view. Thus, efficient quality allocation may be performed.

According to another embodiment, the texture atlas A0 910 for a basic view, the texture atlas A1 920 for an additional view, the geometry atlas A0 930 for a basic view, and the geometry atlas A1 940 for an additional view may be divided and extracted in a tile unit. In addition, a merging method may be determined in a tile unit. In addition, high quality may be allocated to tiles in the texture atlas A0 910 for a basic view and to a tile in the geometry atlas A0 930 for a basic view, and low quality may be allocated to tiles in the texture atlas A1 920 for an additional view and to a tile in the geometry atlas A1 940 for an additional view. Thus, efficient quality allocation may be performed.

According to a determined merge mode, the texture atlas A0 910 for a basic view, the texture atlas A1 920 for an additional view, the geometry atlas A0 930 for a basic view, and the geometry atlas A1 940 for an additional view may be merged so that a merged frame 950 may be generated. A size of the merged frame 950 may correspond to a 5120× 4352 pixel unit. The size of the merged frame is not limited to the above embodiment. The merged frame 950 may be composed of 6 subpictures.

According to another embodiment, according to a determined merge mode, the texture atlas A0 910 for a basic view, the texture atlas A1 920 for an additional view, the geometry atlas A0 930 for a basic view, and the geometry atlas A1 940 for an additional view may be merged in a tile unit so that the merged frame 950 may be generated. In the merged frame 950, there may be 6 tiles and there may be no empty space.

Figure 10:
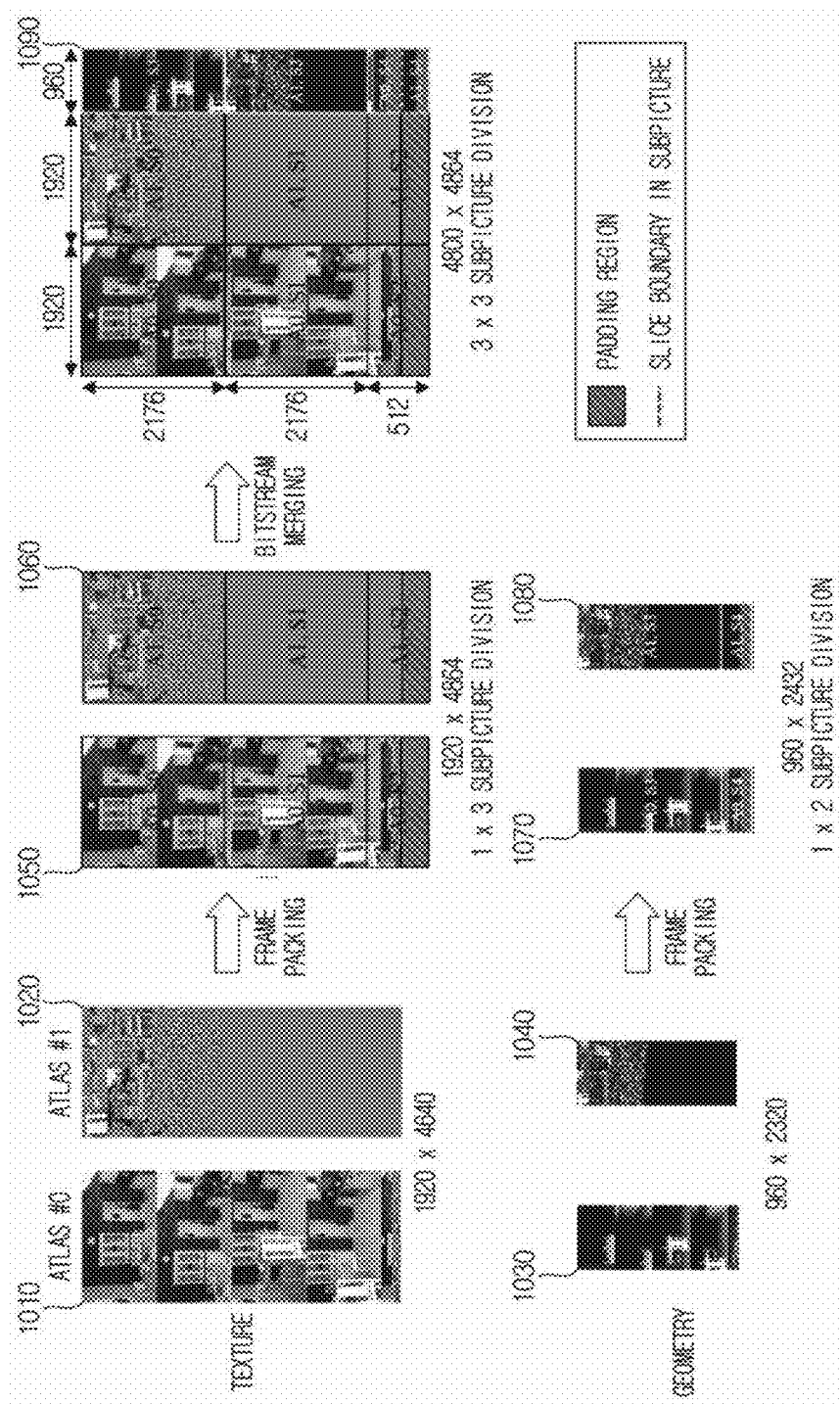
FIG. 10 is a view showing an example of packing a frame by dividing and merging non-uniformly an atlas in a subpicture unit according to yet another embodiment of the present disclosure.

FIG. 10 is a view showing an example of packing a frame by dividing and merging non-uniformly an atlas in a subpicture unit according to yet another embodiment of the present disclosure. Referring to FIG. 10, a texture atlas A0 1010 for a basic view, a texture atlas A1 1020 for an additional view, a geometry atlas A0 1030 for a basic view, and a geometry atlas A1 1040 for an additional view may be forwarded through an MIV encoder. The texture atlas A0 1010 for a basic view and the texture atlas A1 1020 for an additional view may have a size corresponding to a 1920×4640 pixel unit. In addition, the geometry atlas A0 1030 for a basic view and the geometry atlas A1 1040 for an additional view may have a size corresponding to a 960×2320 pixel unit. However, sizes of atlases are not limited to the above embodiment. The texture atlas A0 1010 for a basic view and the texture atlas A1 1020 for an additional view may be frame packed. In addition A texture atlas A0 1050 for a basic view may be divided and extracted in subpicture units S0, S1 and S2. A texture atlas A1 1060 for an additional view may also be divided and extracted in subpicture units S0, S1 and S2. A geometry atlas A0 1070 for a basic view may be divided and extracted in subpicture units S3 and S4. The geometry atlas A1 1080 for an additional view may also be divided and extracted in subpicture units S3 and S4. When a subpicture in each atlas is not a multiple of a CTU size, pixel padding may be generated in the atlas. Pixel padding may be generated in the subpicture S2 in the texture atlas A0 1050 for a basic view and the texture atlas A1 1060 for an additional view. Accordingly, the texture atlas A0 1050 for a basic view and the texture atlas A1 1060 for an additional view may have a size corresponding to a 1920×4864 pixel unit. Pixel padding may be generated in the subpicture S4 in the geometry atlas A0 1070 for a basic view and the geometry atlas A1 1080 for an additional view. Accordingly, the geometry atlas A0 1070 for a basic view and the geometry atlas A1 1080 for an additional view may have a size corresponding to a 960×2432 pixel unit.

In addition, in order to prevent an empty space from being generated, a merging method may be determined in a subpicture unit. A merging method may be determined by considering the horizontal and vertical sizes and resolution of an atlas. There may be a vertical merge mode and a horizontal merge mode in the merging method. However, apart from the vertical/horizontal merge modes, there may be a variety of merge modes. In addition, high quality may be allocated to the subpictures S0, S1 and S2 in the texture atlas A0 1050 for a basic view and to the subpictures S3 and S4 in the geometry atlas A0 1070 for a basic view, and low quality may be allocated to the subpictures S0, S1 and S2 in the texture atlas A1 1060 for an additional view and to the subpicture S3 and S4 in the geometry atlas A1 1080 for an additional view. Thus, efficient quality allocation may be performed.

According to another embodiment, the texture atlas A0 1050 for a basic view, the texture atlas A1 1060 for an additional view, the geometry atlas A0 1070 for a basic view, and the geometry atlas A1 1080 for an additional view may be divided and extracted in a tile unit. In addition, a merging method may be determined in a tile unit. In addition, high quality may be allocated to tiles in the texture atlas A0 1050 for a basic view and to tiles in the geometry atlas A0 1070 for a basic view, and low quality may be allocated to tiles in the texture atlas A1 1060 for an additional view and to tiles in the geometry atlas A1 1080 for an additional view. Thus, efficient quality allocation may be performed.

According to a determined merge mode, the texture atlas A0 1050 for a basic view, the texture atlas A1 1060 for an additional view, the geometry atlas A0 1070 for a basic view, and the geometry atlas A1 1080 for an additional view may be merged so that a merged frame 1090 may be generated. A size of the merged frame 1090 may correspond to a 4800×4864 pixel unit. The size of the merged frame is not limited to the above embodiment. The merged frame 1090 may be composed of 9 subpictures.

According to another embodiment, according to a determined merge mode, the texture atlas A0 1050 for a basic view, the texture atlas A1 1060 for an additional view, the geometry atlas A0 1070 for a basic view, and the geometry atlas A1 1080 for an additional view may be merged in a tile unit so that the merged frame 1090 may be generated. In the merged frame 1090, there may be 9 tiles and there may be no empty space.

FIG. 11 is a view showing reduction of decoding time by dividing and merging an atlas non-uniformly in a tile or subpicture unit according to an embodiment of the present disclosure. Referring to FIG. 11, FIG. 11 may show a test result of a method for MIV non-uniform tiling, packing and quality control as compared with MIV anchors. In comparison with MIV anchors, an MIV non-uniform tiling and packing method may show a reduction of BD-rate. Also, in comparison with MIV anchors, an MIV non-uniform tiling and packing method may show a reduction of decoding time. DATRA (Decoder-Adaptive Tiling and Rate Allocation)+AVLQ (Additional View Low Quality) may show a result obtained by applying asymmetric quality allocation to a basic view and an additional view of the present disclosure. It may be confirmed that DALTRA+AVLQ reduces decoding time as compared with the anchors m54274 and m56827 and DATRA, to which non-uniform tiling and packing and asymmetric quality allocation are not applied. An anchor needs 4 decoders, while the method according to the present disclosure may require only one decoder. The method according to the present disclosure may merge a tile or a subpicture and generate 2, 3, or 4 bitstreams according to the capacity of a client.

FIG. 12 is a view showing reduction of bandwidth by dividing and merging an atlas non-uniformly in a tile or subpicture unit according to an embodiment of the present disclosure. Referring to FIG. 12, FIG. 12 may show a test result of a method for MIV non-uniform tiling, packing and quality control as compared with MIV anchors. In comparison with MIV anchors, an MIV non-uniform tiling and packing method may show a reduction of bandwidth. It may be confirmed that DALTRA+AVLQ reduces bandwidth as compared with the anchors m54274 and m56827 and DATRA, to which non-uniform tiling and packing and asymmetric quality allocation are not applied.

FIG. 13 is a view showing an example of an encoding process of an immersive video according to an embodiment of the present disclosure. Referring to FIG. 13, a first atlas for a basic view of a current image and a second atlas for an additional view of the current image may be received (S1310). In addition, the first atlas and the second atlas may be divided in a predetermined image unit (S1320). The first atlas and the second atlas may be uniformly divided in a predetermined image unit. In addition, the first atlas and the second atlas may be non-uniformly divided in a predetermined image unit. The predetermined image unit may include at least one or more of a tile unit and a subpicture unit. High quality may be allocated to the first atlas in the predetermined image unit. Low quality may be allocated to the second atlas in the predetermined image unit. In addition, an image divided in the predetermined image unit within the first atlas and the second atlas may be extracted (S1330). The first atlas and the second atlas may include at least one or more of a texture atlas and a geometry atlas. In addition, based on a divided image, a merge mode may be determined (S1340). A vertical merge mode and a horizontal mode may be included in a merge mode. In addition, based on a merge mode thus determined, the first atlas and the second atlas may be merged in a predetermined image unit (S1350). As the first atlas and the second atlas are merged, a frame with no empty space present in it may be generated.

FIG. 14 is a view showing an example of a decoding process of an immersive video according to an embodiment of the present disclosure. Referring to FIG. 14, an image, in which a first atlas for a basic view of a current image and a second atlas for an additional view of the current image are merged, may be received (S1410). The first atlas and the second atlas may include at least one or more of a texture atlas and a geometry atlas. In addition, an image divided in the predetermined image unit within the first atlas and the second atlas may be extracted (S1420). The predetermined image unit may include at least one of a tile unit and a subpicture unit. High quality may be allocated to the first atlas in the predetermined image unit. Low quality may be allocated to the second atlas in the predetermined image unit. In addition, the first atlas and the second atlas may be divided in a predetermined image unit (S1430). The first atlas and the second atlas may be uniformly divided in a predetermined image unit. In addition, the first atlas and the second atlas may be non-uniformly divided in a predetermined image unit. In addition, an image divided in the predetermined image unit may be reconstructed (S1440).

In the above-described embodiments, the methods are described based on the flowcharts with a series of steps or units, but the present disclosure is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present disclosure.

The above-described embodiments include various aspects of examples. All possible combinations for various aspects cannot be described, but those skilled in the art will be able to recognize different combinations. Accordingly, the present disclosure may include all replacements, modifications, and changes within the scope of the claims.

The embodiments of the present disclosure may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present disclosure, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high-level language code that may be implemented by a computer using an interpreter. The hardware devices may be configured to be operated by one or more software modules or vice versa to conduct the processes according to the present disclosure.

Although the present disclosure has been described in terms of specific items such as detailed elements as well as the limited embodiments and the drawings, they are only provided to help more general understanding of the disclosure, and the present disclosure is not limited to the above embodiments. It will be appreciated by those skilled in the art to which the present disclosure pertains that various modifications and changes may be made from the above description.

Therefore, the spirit of the present disclosure shall not be limited to the above-described embodiments, and the entire scope of the appended claims and their equivalents will fall within the scope and spirit of the disclosure.

What is claimed is:

1. A method for encoding an image, the method comprising:
   receiving a first atlas for a basic view of a current image and a second atlas for an additional view of the current image;
   dividing the first atlas and the second atlas in a predetermined image unit;
   extracting a divided image divided in the predetermined image unit;
   determining a merge mode based on the divided image; and
   merging the first atlas and the second atlas in the predetermined image unit based on the determined merge mode,
   wherein the dividing of the first atlas and the second atlas in the predetermined image unit non-uniformly divides the first atlas and the second atlas.

2. The method of claim 1, wherein the dividing of the first atlas and the second atlas in the predetermined image unit uniformly divides the first atlas and the second atlas.

3. The method of claim 1, wherein the predetermined image unit corresponds to at least one of a tile unit and a subpicture unit.

4. The method of claim 1, wherein the first atlas comprises at least one or more of a texture atlas and a geometry atlas.

5. The method of claim 1, wherein the second atlas comprises at least one or more of a texture atlas and a geometry atlas.

6. The method of claim 1, further comprising allocating high quality to the first atlas in the predetermined image unit.

7. The method of claim 6, further comprising allocating low quality to the second atlas in the predetermined image unit.

8. The method of claim 1, wherein the merging of the first atlas and the second atlas in the predetermined image unit merges the first atlas and the second atlas so that no empty space exists in a merged image.

9. A non-transitory computer-readable storage medium storing instructions for an image encoding method for generating a bitstream,
   wherein the image encoding method comprises:
   receiving a first atlas for a basic view of a current image and a second atlas for an additional view of the current image;
   dividing the first atlas and the second atlas in a predetermined image unit;

extracting a divided image divided in the predetermined image unit;
determining a merge mode based on the divided image; and
merging the first atlas and the second atlas in the predetermined image unit based on the determined merge mode, and
wherein the dividing of the first atlas and the second atlas in the predetermined image unit non-uniformly divides the first atlas and the second atlas.

10. A method for transmitting a bitstream generated by an image encoding method,
wherein the image encoding method comprises:
receiving a first atlas for a basic view of a current image and a second atlas for an additional view of the current image;
dividing the first atlas and the second atlas in a predetermined image unit;
extracting a divided image divided in the predetermined image unit;
determining a merge mode based on the divided image; and
merging the first atlas and the second atlas in the predetermined image unit based on the determined merge mode,
and wherein the dividing of the first atlas and the second atlas in the predetermined image unit non-uniformly divides the first atlas and the second atlas.

* * * * *